Nov. 13, 1962     C. SAVAGE     3,064,106

ENCLOSED ELECTRIC SWITCHES

Filed Oct. 30, 1959     5 Sheets-Sheet 1

Nov. 13, 1962  C. SAVAGE  3,064,106
ENCLOSED ELECTRIC SWITCHES

Filed Oct. 30, 1959  5 Sheets-Sheet 4

Nov. 13, 1962  C. SAVAGE  3,064,106
ENCLOSED ELECTRIC SWITCHES
Filed Oct. 30, 1959  5 Sheets-Sheet 5

United States Patent Office

3,064,106
Patented Nov. 13, 1962

3,064,106
ENCLOSED ELECTRIC SWITCHES
Conwell Savage, New York, N.Y., assignor to Westinghouse Electric Corporation, East Pittsburgh, Pa., a corporation of Pennsylvania
Filed Oct. 30, 1959, Ser. No. 849,840
11 Claims. (Cl. 200—168)

This invention relates, generally, to electric switches and, particularly, to manually operable switches enclosed in a housing.

It is an object of this invention to provide a switch housing adaptable to receive any one of a plurality of different switch mechanisms.

It is a further object of this invention to provide a switch housing which includes means for supporting internally of the housing different contact means for different switch mechanisms.

It is a further object of this invention to provide contact means of particular structure fixed within a switch housing and operable to be combined with either a rotating contact operating mechanism, or a toggle contact operating mechanism, or a pushbutton operating mechanism.

It is a further object of this invention to provide in an illuminable pushbutton switch, a compact illuminating system for mounting within the switch housing.

More specifically, it is an object of this invention to provide a compact illumination system for an illuminable switch wherein the lamp terminals are biased for rotation about fulcrum means by side mounted spring means to provide engagement between the terminals and the lamp base terminals and at the same time provide for over-travel by the bayonet-type lamp in the socket.

The switch mechanisms of this invention will be more fully understood by referring to the following description and the accompanying drawings illustrating embodiments of the invention.

Figure 27:
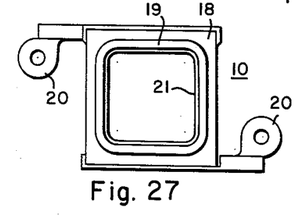
FIG. 27 is a top plan view of the switch housing of FIG. 1, FIG. 30 and FIG. 37.
Figure 28:
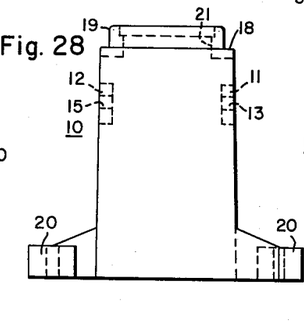
FIG. 28 is a side elevational view of the switch housing, taken from the bottom of FIG. 27.
Figure 29:
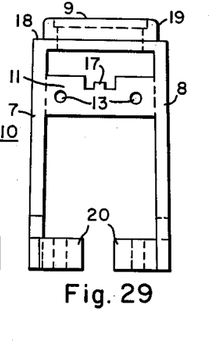
FIG. 29 is a side elevational view of the switch housing taken from the right of FIG. 27.

Referring now to FIGS. 27, 28 and 29 of the drawing, there is disclosed a switch housing generally indicated at 10, and adaptable to receive individual ones of a plurality of different types of switch mechanisms to be described in detail hereinafter. The housing may be molded from a suitable insulating material. The housing is substantially U-shaped in form and is comprised of a pair of substantially parallel arms or walls 7 and 8 which are joined by a base portion 9. The walls 7 and 8 are also joined by each one of a pair of bridging members 11 and 12 which are oppositely disposed across the space between the arms 7 and 8, and which are spaced from the base 9 along the length of the walls 7 and 8.

Each bridging member includes a pair of spaced apertures 13—13 and 15—15, respectively, to receive mounting screws for different types of stationary contacts as will be hereinafter described in detail. Bridge 11 includes a cutout tab 17 on the upper side integral with the bridge for supporting spring means as will be hereinafter described. The base 9 of the U-shaped housing is laterally depressed forming a peripheral shoulder 18 adapted to abut the inside surface of a cover plate or wall 14 (FIG. 30), and forming a peripheral lip 19 defining a rectangular opening the upper end of the housing and extending above the shoulder to protrude through the wall or cover plate. A pair of apertured ears 20—20 are formed integral with the housing for receiving screws to fix the housing to a support mechanism such as an inside wall 44. The protruding lip 19 isolates the switch operating mechanism from the cover plate so that any misalignment between the cover plate and the housing will not bind or otherwise interfere with the operation of the switch operating mechanism as will be hereinafter described.

Figure 1:
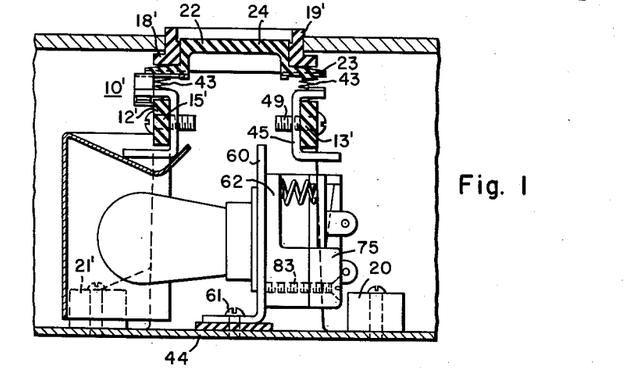
FIGURE 1 is a cross-sectional view of an illuminable pushbutton switch taken substantially along the line I—I of FIG. 2.
Figure 2:
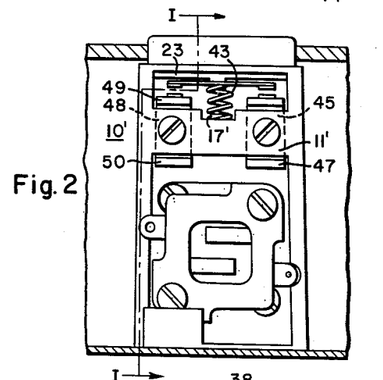
FIG. 2 is a side elevational view of the pushbutton switch taken from the right of FIG. 1.
Figure 3:
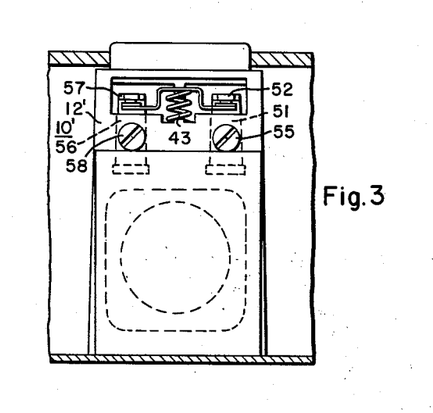
FIG. 3 is a side elevational view of the pushbutton switch taken from the left of FIG. 1.

Referring now to FIGS. 1, 2 and 3 of the drawing, there is shown an illuminated momentary pushbutton mechanism as fixed in switch housing 10' which is identical in structure to the housing 10 previously described, with the various parts of the housing 10' carrying the same reference numerals as applied to the corresponding parts of the housing 10 of FIGS. 27, 28 and 29, but with the addition of the suffix (').

Figure 4:
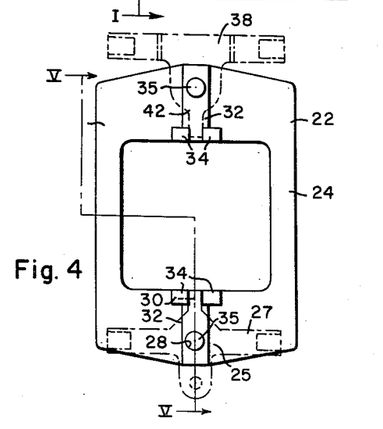
FIG. 4 is a bottom plan view of the pushbutton of FIG. 1.
Figure 5:
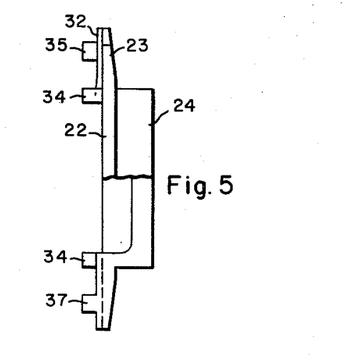
FIG. 5 is a side elevational view of the pushbutton of FIG. 4, taken partly in section along the line V—V of FIG. 4.

A pushbutton member 22, shown in detail in FIGS. 4 and 5, is fitted within the cavity formed by lip 19' at the top of housing 10'. The pushbutton is composed preferably of translucent material to pass illumination from within the housing 10'. The pushbutton is basically a disc and is rectangular in shape, having a thin outer peripheral flange 23 of such width as to extend across the cutout portion of the housing 10' above the bridge members 11' and 12', and of such length as to extend through the cutout portions beyond the sides of the housing as illustrated in FIG. 1. The thickness of the flange is substantially less than the distance between the top of the cut-out portion and the top of the bridges 11 and 12 to permit movement of the pushbutton up and down in the housing 10'. The central portion 24 of the pushbutton is rectangular and is raised with respect to the flange 23 and is adapted to slidably fit for vertical movement into the aperture formed by the lip 19'. The height of the raised portion 24 above the flange 23 is less than the distance between the top of the cutout portion and the top of lip 19' so that when the pushbutton is in the uppermost position, as shown in FIGS. 1, 2 and 3, the raised portion 24 is recessed within the lip 19' to minimize the possibility of accidental opertaion of the pushbutton by the clothing of passers-by. On the underside of the pushbutton, a pair of identical ridges 32—32 extend radially outwardly in opposite directions from the inner side of the flange to the outer end of the flange. Each of the ridges 32—32 includes a pair of spaced bosses 34—34 at the inner end of the ridge adjacent the central portion 24 of the pushbutton and includes a stud 35—35 near the outer end of the flange. The ridges, bosses and studs serve as locating mechanism for the movable contacts as hereinafter described.

Figure 6:
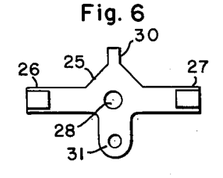
FIG. 6 is a bottom plan view of the normally open movable contact bridge of FIG. 1.
Figure 7:
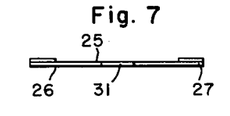
FIG. 7 is an end elevational view of the contact bridge of FIG. 6.

Movable contacts are carried by the ends of the pushbutton so that the center of the pushbutton is unobstructed to thus permit passage of illumination emanating from within the housing. Specifically, FIGS. 6 and 7 illustrate the normally open contact bridge body 25 composed of flat, flexible, conducting material and having contact arms 26 and 27 extending in opposite directions therefrom and having an aperture 28 centrally positioned and aligned with the contact arms. A guide tab 30 extends from the body in a direction perpendicular to the bridge arms. A terminal tab 31 extends from the body in a direction opposite that of the guide tab.

As illustrated in FIGS. 2 and 4, the contact bridge 25 is fixedly located on the pushbutton by means of the spaced bosses 34 on the pushbutton which straddle the guide tab 30 on the bridge and by way of the stud 35 extending through aperture 28.

Figure 8:
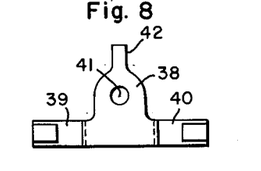
FIG. 8 is a top plan view of the normally closed movable contact bridge of FIG. 1.
Figure 9:
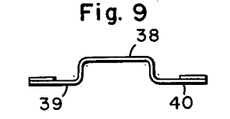
FIG. 9 is an end elevational view of the contact bridge of FIG. 8.

The normally closed contact bridge body 38 includes a pair of contact arms 39 and 40 extending outwardly in opposite directions, with each arm bent in a reverse curve to position the contacts in a plane different from, but parallel to the plane of the body portion, as illustrated in FIGS. 8 and 9. The bridge body is provided with an aperture 41 positioned out of alignment with the arms 39 and 40 along a line perpendicular to the bridge arms. A guide tab 42 extends outwardly of the body 38 perpendicular to the arms and aligned with the aperture 41. The guide tab 42 and the aperture 41 of bridge 38 are identical in size and position with respect to the corresponding tab 30 and aperture 28 of the previously described bridge 25, to facilitate the interchangeability of the two types of contacts on the pushbutton, but at the same time provides for positioning the contacts externally of the housing 10' as illustrated in FIG. 1, thus providing free vertical movement of the pushbutton. As illustrated in FIGS. 3 and 4, the normally closed contact bridge is located on the pushbutton by way of the bosses 34 on the pushbutton which straddle the guide tab 42 on the contact bridge and by way of stud 35 extending through aperture 41.

The pushbutton is normally maintained in the uppermost position, as illustrated in FIGS. 1 and 3, by means of a pair of compression springs 43—43, one on each side of the button, and each compressed between the pushbutton and one of the bridge members of the housing 10'. For example, one spring 43 has one end engaging the stud 35 on the bottom of the pushbutton while the other end engages the spring tab 17' on the upper side of bridge member 11'. It is to be noted that the compression springs 43—43 also serve the additional purpose of holding the corresponding contact bridge 25—38 against the pushbutton to maintain engagement between the previously described locating means on the pushbutton and on the respective contact bridges, thus eliminating the necessity for additional means to lock these elements together.

Figure 10:
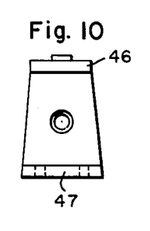
FIG. 10 is a side elevational view of the normally open fixed contact support of FIG. 1.
Figure 11:
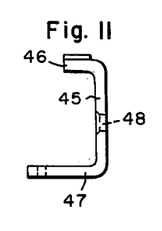
FIG. 11 is a side elevational view of the fixed contact support of FIG. 10.

The stationary contact corresponding to the movable normally open contact bridge 25 is shown in FIGS. 10 and 11 as comprising a U-shaped support 45 and including a contact arm 46 and a terminal arm 47. The body of the U-shaped support is apertured as at 48 to receive a mounting screw 49 for attaching the contact support to the housing 10' by way of aperture 13 in bridge member 11', as illustrated in FIGS. 1 and 2. A similar stationary contact support 48 having a contact arm 49 and a terminal arm 50 is attached to the bridge member 11' so that the contact arm is immediately below the contact arm 26 of movable contact bridge 25.

Figure 12:
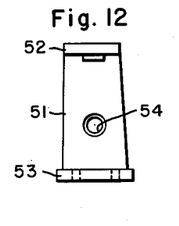
FIG. 12 is a side elevational view of the fixed contact support of the normally closed contact mechanism of FIG. 1.
Figure 13:
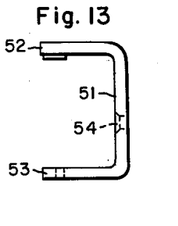
FIG. 13 is a side elevational view of the fixed contact of FIG. 12.
Figure 14:
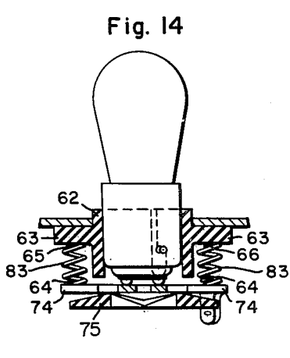
FIG. 14 is a cross-sectional view of the illuminating system of FIGS. 1, 16 and 17, taken substantially along the line XIV—XIV of FIG. 17.
Figure 15:
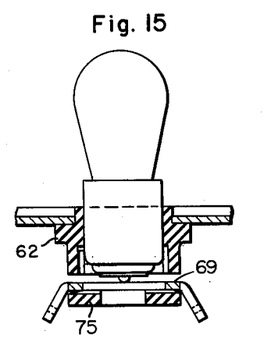
FIG. 15 is a cross-sectional view of the illuminating system taken substantially along the line XV—XV of FIG. 17.

The stationary contact support corresponding to each of the contact arms of the normally closed contact bridge of FIGS. 8 and 9 is shown in FIGS. 12 and 13 as comprising a U-shaped support 51 having a contact arm 52 and a terminal arm 53. An aperture is provided in the body as at 54 to receive a mounting screw 55 for attaching the support to the bridge member 12'. A similar stationary contact support 56 having a contact arm 57 and a terminal arm (not shown) is attached to the bridge 12' by means of a screw 58. It is to be noted that the stationary contact support of FIGS. 12 and 13 differs from the stationary contact support of FIGS. 10 and 11 in three respects. Firstly, in the normally closed contacts, the contact faces inwardly with respect to the U-shaped support so as to make connection with the contacts on the bridge 38 when the pushbutton is in the uppermost condition as shown in FIG. 3, while in the latter the contact faces outwardly with respect to the U-shaped support to engage the contact on the bridge 25 only when the pushbutton is in the lowermost position. Secondly, in the former the body portion of the support is longer between the arms to raise the height of the contact arms with respect to the pushbutton when it is in the uppermost condition to act as a limit to the movement of the pushbutton. Thirdly, the contact arm of the normally closed contact bridge is longer for positioning the contacts externally of the housing 10' and externally of the bridging member 12' so that when the pushbutton is pressed downwardly, the movable contact bridge 38 will clear the bridging member 12'. In addition, the relatively long contact arm provides for the return spring to act on the contact bridge at a point between the contacts and the guide tab 42, thus permitting the contacts to be closed and the pushbutton to be seated while at the same time providing clearance between the contact bridge and the pushbutton at the stud 35 to allow for contact wear and manufacturing variations.

It is seen that the foregoing construction provides for interchangeability of normally open and normally closed contacts on both sides of the pushbutton. Where it is desired to use only one contact bridge, a hinge or fulcrum (not shown) may replace the other stationary contact. The hinge or fulcrum may be identical in shape to the stationary contact of FIGS. 10 and 11 except that the fulcrum portion corresponding to the contact support arm is bent upwardly to align with the body portion of the support to bear directly against the pushbutton in the uppermost position. This fulcrum arrangement amplifies the motion of the button so that only a small movement of the center portion 24 will operate the button even though the contact gap may be relatively large.

Referring now to FIGS. 1 and 14 through 26, there is shown in detail the illuminating means of FIG. 1 adapted to be mounted within the housing 10' to illuminate the previously-described translucent push-button. A bracket 60 (FIG. 1) is attached to the rear cover plate 44 as by screws 61 and extends upwardly within the housing 10' to provide a mount for a lamp socket indicated generally at 62.

Figure 18:
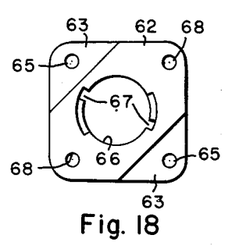
FIG. 18 is a bottom view of the lamp socket of FIG. 1.
Figure 19:
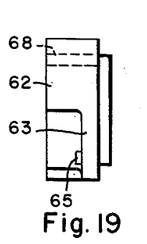
FIG. 19 is a side elevational view of the lamp socket taken from the right of FIG. 18.
Figure 20:
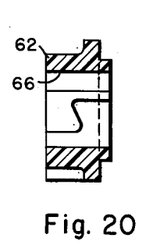
FIG. 20 is a cross-sectional view of the lamp socket taken substantially along the line XX—XX of FIG. 21.
Figure 21:
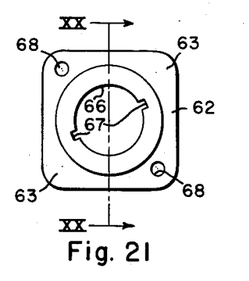
FIG. 21 is a top plan view of the lamp socket of FIG. 18.
Figure 22:
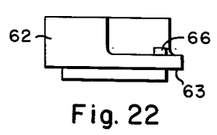
FIG. 22 is a side elevational view of the lamp socket, taken from the bottom of FIG. 18.
Figure 23:
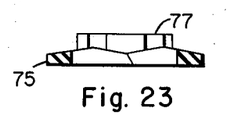
FIG. 23 is a cross-sectional view of the socket cover taken substantially along the line XXIII—XXIII of FIG. 26.
Figure 24:
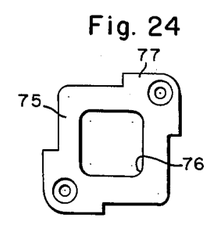
FIG. 24 is a bottom plan view of the socket cover of FIG 1.
Figure 25:
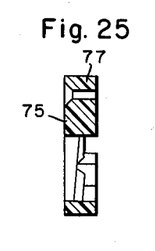
FIG. 25 is a side elevational view of the socket cover of FIG. 24.
Figure 26:
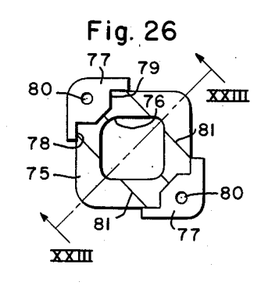
FIG. 26 is a top plan view of the socket cover of FIG. 24.

The socket is comprised of insulating material and is basically a rectangular solid having portions of two opposing sides omitted to provide a pair of ears 63—63. For the purpose of mounting a spring biasing means for the lamp terminals as hereinafter described, each ear includes a centrally located boss 65—65 on the underside of the ear extending parallel to the main portion of the socket. A centralized hole or bore 66 extends completely through the cylinder and includes a pair of grooves 67—67 extending the full length of the bore on opposite sides of the bore, each groove having a portion intermediate its length which widens and returns slightly for locating corresponding bayonet pins on a double contact lamp base. An auxiliary pair of bores 68—68 are provided through the socket running parallel to the lamp socket bore to receive screws for attaching the socket to the bracket 60.

For the purpose of connecting the lamp in an electrical circuit, there is provided a pair of substantially U-shaped lamp terminals 69—69 (FIG. 16) cut from flat stock, each having a contact arm 72—72 and a balance arm 73—73. Each terminal 69 includes a protrusion 74—74 at one corner of the squared U serving as a support for a boss 64 (FIG. 14) which, in turn, serves as an anchor for spring biasing means as hereinafter described. The terminals are positioned adjacent the bottom of the socket 62 by a socket cover 75 shown in detail in FIGS. 23 through 26.

The socket cover 75 is composed of insulating material and is basically rectangular in form, having a rectangular cutout central portion 76. The socket cover is substantially flat except for a raised pair of ears 77 on diagonally opposed corners of the socket cover, each ear having a pair of notches 78 and 79 facing the cutout portion 76 and having a bore 80 for receiving screws to attach the socket cover to the socket. The socket cover is otherwise shaped to provide a pair of parallel fulcrum ridges 81—81 extending diagonally across the socket cover between the ears 77 and spaced to substantially straddle the cutout portion 76.

Figure 16:
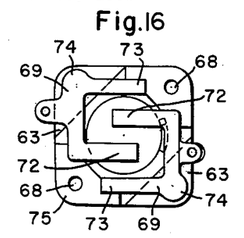
FIG. 16 is a bottom plan view of the illuminating system of FIG. 1, with the socket cover removed.
Figure 17:
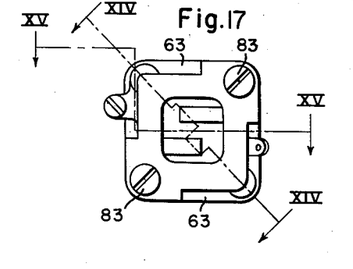
FIG. 17 is a bottom plan view of the illuminating system of FIGS. 1 and 16, with the socket cover in place.

When the socket cover is attached to the socket as by screws 83—83 (FIGS. 1, 2 and 17) the raised ears 77 provide a space between the bottom of the socket 62 and the fulcrum ridges 81—81 for receiving the terminals 69—69 so that each contact arm 72 and each balance arm 73 laterally abuts one notch 78 in the socket cover, as illustrated in FIG. 16. Each protrusion 74—74 on the terminals 69—69 is positioned outwardly of one of the ridges 81—81 and outwardly of the main body of the socket 62 in a position vertically below one of the studs 65—66 on the ears 63—64 of the socket 62, while the arms of each terminal 69—69 extend inwardly of the corresponding ridge 81—81 so that a rocking relationship is established between each terminal 69—69 and the corresponding fixed fulcrum ridge 81. A pair of compression springs 83—83 is provided between each ear 63—63 of the socket 62 and the corresponding protrusion 74—74 on each terminal 69 to bias the protrusion downwardly and consequently, by means of the rocking action, bias the contact arms 72 upwardly to engage the corresponding lamp base terminal. When the lamp is to be inserted or removed from the socket 62, thus requiring that the lamp be moved downwardly beyond its terminal position in the socket to allow the bayonet pins to negotiate the reverse grooves 67—67 in the socket 62, the rocking mechanism provides for free downwardly directed motion of the contact arms against the bias of the springs 83—83.

It is seen from the foregoing construction that the lamp socket occupies very little space by providing for the containment of the mounting screws and the biasing springs in the space between the socket 62 and the square area the lamp must occupy.

Referring now to FIGS. 30 through 36, there is disclosed a toggle switch mechanism contained within a housing 10" identical to the housing previously described in FIGS. 27 through 29 and having corresponding parts identified by the same reference numerals used in FIGS. 27 through 29, with the addition of the suffix ("). Each of a pair of side plates 84—84 are attached to a cutout side portion of the housing 10" by means of screws 85—85 passing through the plates and the apertures 13"—13", 15"—15" in the bridge members 11"—12" respectively. The side plates are identical in structure and include a number of apertures for supporting and controlling the switch mechanism as hereinafter described.

Figure 30:
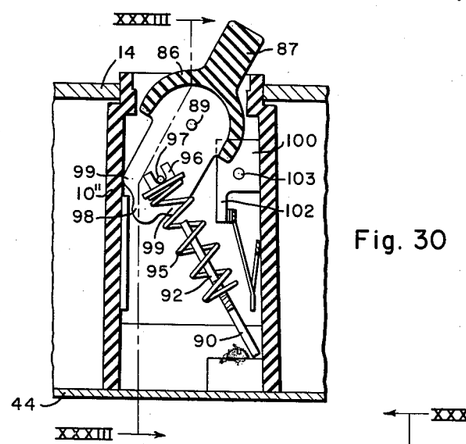
FIG. 30 is a cross-sectional view of a toggle switch shown mounted in the housing of FIG. 27, taken substantially along the line XXX—XXX of FIG. 33, and showing the switch in the closed condition.

An operating lever generally indicated at 86 is provided for operating the contact mechanism as hereinafter described, and includes an operating arm 87 and a pair of spaced switching arms 88—88. The lever is pivotally mounted intermediate its arms for movement about a pin 89 mounted at each end at the upper end of each plate 84—84 to provide for the extension of the operating lever upwardly through the opening defined by the lip 19". The lower end of each operating arm 88—88 is laterally depressed to form contact operating tabs 98—98 between shoulders 99—99 for operating contacts as will be hereinafter described. Manipulation of the operating arm from side to side about the pin provides a corresponding side to side motion of the contact operating arms to open and close the contacts in a manner to be hereinafter described.

Figure 31:
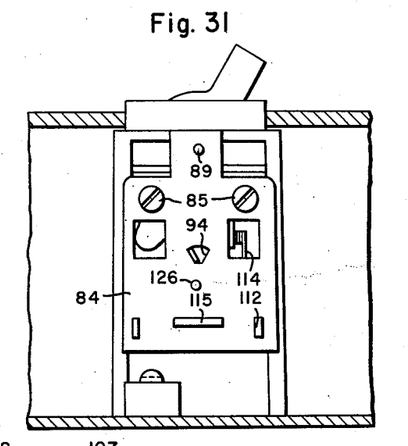
FIG. 31 is a side elevational view of the toggle switch of FIG. 30 showing one of the side plates locating the toggle mechanism within the housing.
Figure 32:
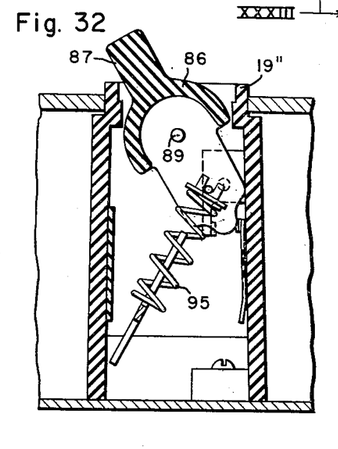
FIG. 32 is a cross-sectional view of the toggle switch of FIG. 30 similar to that of FIG. 30, but showing the switch in an open condition.

A substantially V-shaped spring rocker 90 having arms 91—91, and having a spring locating tab 92 in the apex of the arms, is pivotally mounted by means of tabs 93—93 on the rocket 90 located in apertures 94—94 centrally located in the plates 84—84 for movement about an axis through the tabs 93—93 as located by the apertures 94—94 in the side plates. A spring 95 is compressed between the spring locating tab 92 and a pivot member 96 pivotally mounted on a pin 97 connecting the lower extremity of the spaced operating arms 88—88 of the lever 86. Thus, the spring 95 pushes the operating arms 88—88 away from the spring rocker to hold the operating lever arms 88—88 to one side or the other of the housing 10″, depending upon the direction the pivot pin 97 is off-center with respect to a dead-center toggle line drawn through the fixed pivots 89 and 93. When the lever arm 87 is manually pushed from one side to the other, the spring 95 and rocker 90 resist movement of the lever until the pivot pin 97 has passed through the dead-center position, whereafter the compression spring acts to move the operating arms 88—88 in the off-center direction until the operating arms 88—88 strike the sides of the housing 10″, where they remain until the lever arm 87 is manually forced in the other direction against the bias of the spring.

Figure 33:
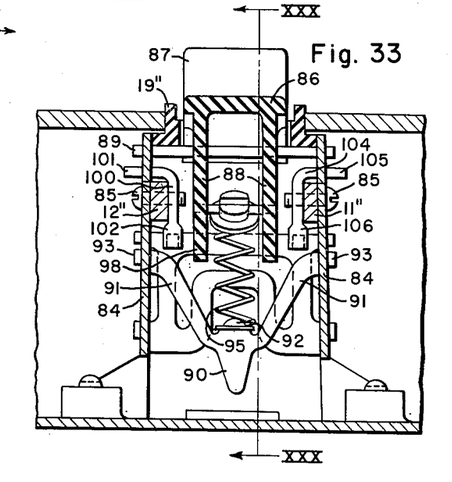
FIG. 33 is a cross-sectional view of the toggle switch taken substantially along the line XXXIII—XXXIII of FIG. 30.

The fixed contact structure comprises a flat rectangular contact support 100 having a terminal tab 101 at one end extending in a direction perpendicular to the plane of the support 100, and having a contact tab 102 at the other end extending in a direction within the plane of the support 100. An aperture 103 is provided centrally of the support 100 to receive one of the mounting screws 85 (FIG. 33), thus fixing the contact support to the bridge 12″ of the housing so that the contact tab 102 is spaced from the wall of the housing 10″, as in FIG. 30, to provide space for movement of a corresponding movable contact to be hereinafter described. When so mounted, the terminal tab 101 extends externally of the housing 10″ over the plate 84 and bridge member 12″. A second fixed contact structure 104 is identical to the fixed contact structure 100 except that the terminal tab 105 extends from the support 104 in a direction relatively opposite to that of tab 101 with respect to support 100 and contact tab 102 so that the terminal tab 105 extends outwardly of the housing 10″ on the opposite side of the housing 10″, as shown in FIG. 33.

Figure 35:
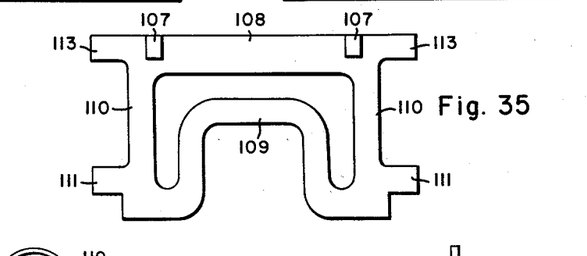
FIG. 35 is a front elevational view of the movable contact bridge for the toggle switch of FIG. 30 and the twist key switch of FIG. 36.

The movable contact bridge shown in detail in FIG. 35 comprises a rectangular frame member cut from flat flexible conducting material, and having a pair of spaced contacts 107—107 at opposite ends of one frame member 108, and having the opposite frame member 109 curved upwardly within the area defined by the member 108 and side members 110—110 to form a spring tab which may be bent away from the plane of the frame to provide a biasing means for abutting the wall of housing 10″ to bias the contacts 107 of frame member 108 into contact with the contact tabs 102—106 on the fixed contact supports 100 and 104, respectively. The frame members include tabs 111—111 at the bottom corners for engagement in apertures 112—112 of the side plates 84—84 for locating the frame member 108 for pivotal action to engage and disengage the fixed contact arms 102—106. A pair of tabs 113 at the upper corners of the frame member 108 extend through guide slots 114—114 in the side plates 84—84, which guide slots limit the movement of the frame member 108 in its pivotal movement.

When the lever arm 86 is operated in one direction in the manner previously described, the tabs 98—98 on the operating arms 88—88 engage the frame member 108 to open the corresponding contacts against the action of spring tab 109 on the frame member 108. When the lever 86 is reversely operated to disengage the frame member 108, the spring tab promotes engagement of the contacts.

Figure 34:
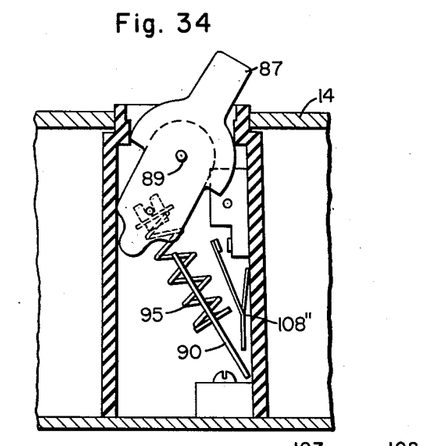
FIG. 34 is a cross-sectional view of the toggle switch similar to that of FIG. 30, but showing the contact mechanism reversed.

The structure of the fixed contact supports and the movable contact frame as hereinafter described, provides for readily converting the normally closed contact structure of FIGS. 30 through 33 to a normally open contact structure as illustrated in FIG. 34. This is achieved by merely exchanging the fixed contacts 100—104 so that each fixed contact support is positioned on the opposite side of the housing, and, at the same time, reversing the position of the frame member and bending the spring tab 109 in the other direction so that the contacts 107 face the repositioned contact tabs 102—106 but are thus normally biased out of engagement therewith.

Referring again to FIG. 31, it is seen that the side plates include additional apertures symmetrically arranged with respect to the previously-described apertures 114 and 112 for guiding and locating the fixed contacts and movable contacts. Accordingly, an additional contact group identical to that previously described may be readily provided in housing 10″ opposite the contact mechanisms as shown.

Figure 36:
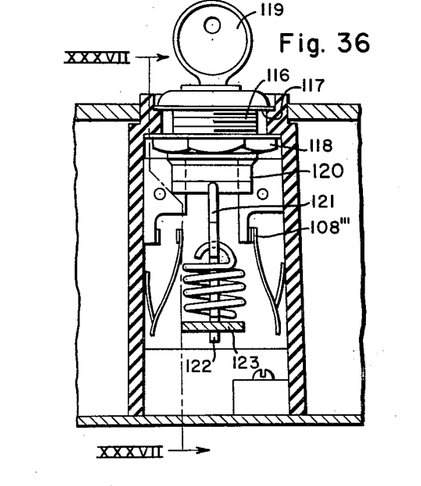
FIG. 36 is a cross-sectional view of a twist key switch taken substantially along the line XXXVI—XXXVI of FIG. 37 and shown mounted in the housing of FIG. 27 and including the contact mechanism of the toggle switch of FIG. 30.
Figure 37:
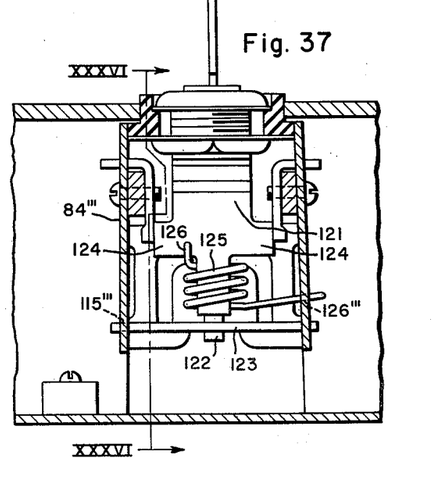
FIG. 37 is a cross-sectional view of the twist key switch taken substantially along the line XXXVII—XXXVII of FIG. 36.

Referring now to FIGS. 36 and 37, there is disclosed a lock switch mechanism enclosed in a housing 10‴ identical in structure to the previously-described housing 10 of FIGS. 27 through 29 corresponding parts having the same reference numerals, except for the addition of the suffix (‴). In addition, the lock switch utilizes the identical moving contact bridge, identical stationary contacts, and identical side plates as used in the previously-described toggle switch. The switch may optionally be assembled with either one or two normally open contact structures, one or two normally closed contact structures, or mixed contact structures of both types.

The lock switch mechanism for opening and closing the contacts comprises a key operated cylinder lock mechanism 116 of standard type and having a peripheral flange 117 fixed thereto at the upper end and having a nut and washer 118 threadedly received on the other end to form a flange opposite the upper flange 117 and cooperating therewith to grip the ridge 21‴ on the inside of housing 10‴ to fix the cylinder lock mechanism 116 with respect to the housing 10‴ so that a key 119 may extend upwardly through the aperture defined by the lip portion 19‴. A slotted cam 120 extends below the cylinder 116 and is adapted to rotate about the longitudinal axis through the cylinder in response to rotation of the key 119 in the lock 116, all in a conventional manner. An actuator 121 is fixedly received in the slotted cam and rotates with the cam to operate the contacts within the housing. A stud 122 at the lower end of the actuator is received for rotation within an aperture in a bearing plate 123 fixed perpendicular to the longitudinal axis of the cylinder 116 and the actuator 121 by means of the slots 115‴ (corresponding to slot 115 in FIG. 31) in the side plates 84‴. A pair of actuator ears 124—124 extend laterally from the actuator 121 to slidably engage the frame member 108‴ of the movable bridge contacts to operate the contacts on both sides of the housing 10‴. A coil spring 125 encircles the lower portion of the actuator 121, having an end 126 bent to abut one of the ears 124 of the actuator and having the other end extending through an aperture in one of the side plates 84‴ to thus continuously bias the actuator to the off position as shown in FIGS. 36 and 37.

It is to be understood that the lock mechanism 116 may be of the type which permits removal of the key from the lock only when the lock is in the off position, thus providing a momentary contact switch. Alternatively, the lock may be of the type which permits removal of the key from the lock in both the on and off positions, thus providing a maintained contact switch. In any event, the biasing spring prohibits the switch from remaining in an intermediate position.

From the foregoing it is seen that there is provided a pushbutton switch mechanism, a toggle switch mechanism and a twist key mechanism having a common housing. In addition, the toggle switch mechanism and the twist key switch mechanism share a common contact mechanism. This structure provides economical manufacture of three different types of switch mechanisms.

Alternative forms may be utilized in the foregoing switches. For example, in the pushbutton switch, the shape of the pushbutton may be round or oval or rectangular, rather than square, as illustrated. The switch housing may be fastened to the cover plate rather than to the inside wall, as shown.

Since certain changes may be made in the above described construction, and different embodiments of the invention may be made without departing from the scope of the invention, it is intended that all matter contained in the above description and shown in the accompanying drawing shall be considered as illustrative and not in a limiting sense.

I claim as my invention:

1. In a switch; a one-piece housing comprising a body for receiving a switch mechanism; said body comprising a single pair of spaced side walls joined by a bridging member; an opening in the bridging member; a lip portion extending peripherally around the opening and extending outwardly of the bridging member to extend through an opening in a wall when the body is mounted against the wall; a pair of oppositely disposed spaced bridging members joining said side walls below the first bridging member, fixed contact members attached to said spaced bridging members, an actuating member disposed in said opening, and movable contact members actuated by the actuating member into and out of engagement with said fixed contact members.

2. In a switch; an integral housing comprising a body for receiving a switch mechanism; said body comprising a single pair of spaced oppositely disposed side walls joined by a bridging member; an opening in the bridging member; a lip portion extending peripherally around the opening and extending outwardly of the bridging member to extend through an opening in a wall when the body is mounted against the wall; a pair of oppositely disposed spaced bridging members joining said side walls below the first bridging member, fixed contact members attached to said spaced bridging members, movable contact members actuated by said mechanism into and out of engagement with said fixed contact members, and an actuating member disposed in said opening for operating said mechanism.

3. In a switch; a one-piece housing comprising a body for receiving any one of a plurality of interchangeable switch mechanisms of different types; said body having a single pair of oppositely disposed spaced side walls joined by a bridging member; an opening in the bridging member; a lip portion extending peripherally around the opening and extending outwardly of the bridging member to extend through an opening in a wall when the body is mounted against the wall; a pair of spaced oppositely disposed spaced bridging members joining said side walls below the first bridging member, fixed contact members attached to said bridging members, an actuating member disposed in the opening in the bridging member, and movable contact members actuated by the actuating member into and out of engagement with said fixed contact members.

4. In a switch; an integral housing comprising a body for receiving any one of a plurality of interchangeable switch mechanisms of either a pushbutton or a toggle or a rotating type; said body having only one pair of oppositely disposed spaced side walls joined by a bridging member; an opening in the bridging member; a lip portion extending peripherally around the opening and extending outwardly of the bridging member to extend through an opening in a wall when the body is mounted against the wall; a pair of oppositely disposed spaced bridging members joining said side walls below the first bridging member, fixed contact members attached to said spaced bridging members, an actuating member disposed in the opening in the bridging member and movable contact members actuated by the actuating member into and out of engagement with said fixed contact members.

5. In a pushbutton switch: a switch housing having only two oppositely disposed spaced side walls joined by a bridging member with an opening in the bridging member at the top; two spaced supporting members joining the side walls to provide guide slots between the bridging member and the supporting members; a pushbutton slidably received for vertical movement in said opening and having ear portions extending through the guide slots; the thickness of the ear portions in the vertical direction being less than the width of the guide slots in the vertical direction; locating bosses on the underside of said ear portions; fixed contact means below the ear portions and attached to the supporting members; movable contact means having mating locating means for the locating bosses to fix the movable contacts to the underside of the ear portions above the fixed contact means, and spring means compressed between the supporting members at the bottoms of the guide slots and the locating bosses on the pushbutton to bias the pushbutton upwardly and to provide continuous mating engagement between the bosses on the pushbutton and the mating locating means on the movable contact means.

6. In a pushbutton switch: a switch housing having only two oppositely disposed spaced side walls joined by a bridging member with an opening in the bridging member at the top; two oppositely disposed supporting members joining the side walls and spaced from the bridging member; a pushbutton slidably received for vertical movement in said opening; ear means on the pushbutton extending into the spaces between the supporting members and the bridging member; locating means on the ear means; movable contact means having locating means in mating engagement with the locating means on the pushbutton; fixed contacts positioned vertically with respect to the movable contacts and attached to the supporting members; spring biasing means having one end fixed with respect to the supporting member and having the other end compressed vertically against the movable contact means to bias the pushbutton in a predetermined direction and to maintain mating engagement between the locating means on the pushbutton and the mating locating means on the movable contacts.

7. In a pushbutton switch: a switch housing having only two oppositely disposed spaced side walls joined by a bridging member with an opening in the top; two oppositely disposed supporting members joining the side walls and spaced from the bridging member; a pushbutton composed of light transmitting material slidably received in the opening for vertical movement therein; ear means on the pushbutton extending into the spaces between the supporting members and the bridging member; locating means on the ear means; movable contact means having locating means in mating engagement with the locating means on the pushbutton; fixed contacts positioned vertically with respect to the movable contacts and attached to the supporting members; spring biasing means having one end fixed with respect to the supporting member and having the other end compressed vertically against the movable contact means to bias the pushbutton in a predetermined direction and to maintain mating engagement between the locating means on the pushbutton and the mating locating means on the movable contacts; and means centrally disposed in the housing for illuminating the pushbutton.

8. In a switch: a switch housing; contact means including fixed contact means attached to the housing, and movable contact means cooperating therewith; said movable contact means comprising a flat frame member comprised of resilient material having laterally extending pivot tabs; contact means at the upper end of the movable contact means; bias tab means extending acutely from the frame member at a point substantially along the pivot line connecting the pivot tabs, said pivot tabs attached to opposing pair of housing walls so that the spring tab engages the wall between said opposing walls to bias the contact end of the frame member in a predetermined position with respect to the fixed contacts, and switch operating means including operating arms rotatable about a pivot point fixed with respect to the housing to effect operation of the contact means.

9. In a switch: a switch housing; contact means including fixed contact means attached to the housing, and movable contact means cooperating therewith; said movable contact means comprising a flat frame member composed of resilient material having laterally extending pivot tabs; contact means at the upper end; bias tab means extending acutely from the frame member at a point substantially along the pivot line connecting the pivot tabs; said pivot tabs attached to an opposing pair of housing walls so that the spring tab engages the wall between said opposing walls to bias the contact end of the frame member in a predetermined position with respect to the contacts; a switch operating means within the housing including operating arm means rotatable about a pivot fixed with respect to the housing to effect operation of the contact means; said operating arm rotatable about a pivot in a direction perpendicular to the plane of the movable contact frame and operable at the extremity of its movement to engage the frame intermediate the upper ends to move the contact end of the frame relative to the fixed contacts to change the condition of engagement therebetween; a spring rocker pivotally attached to said opposite sides of the housing to pivot about an axis parallel to and fixedly spaced from the pivot axis of the arm; a spring compressed between said spring rocker and a second pivot axis on the lower end of said arm to provide off-center toggle action of the lever arm when the second pivot on said arm is moved across center of a line between the first pivot of the arm and the spring rocker arm pivot.

10. In a switch: a switch housing; contact means including fixed contact means attached to the housing and movable contact means cooperating therewith; said movable contact means comprising a flat frame member composed of resilient material having laterally extending pivot means at the lower end; contact means at the upper end of said frame member; bias tab means extending acutely from the frame member at a point substantially along the pivot line connecting the pivot tabs; said pivot tabs pivotally attached to an opposing pair of housing walls so that the spring tab engages the wall between said opposing walls to bias the contact end of the frame member in a predetermined position with respect to the fixed contacts; a switch operating means within the housing including operating arm means rotatable about a fixed pivot with respect to the housing to effect operation of the contact means; said operating means comprising a twist lock mechanism fixed wtih respect to the housing and having a key end extending externally of the housing and a cam end extended within the housing; a cam end extending within the housing; an elongated actuator fixedly mounted in the cam; said cam operable to rotate about a longitudinal axis through the lock when the key end is rotated; said actuator having ear means extending perpendicularly to said longitudinal axis and operable to engage the upper contact end of said frame member to change the condition of engagement between the fixed contacts and the movable contacts when the cam is rotated to a predetermined position with respect to the housing.

11. In a switch: a switch housing; contact means including fixed contact means attached to the housing and movable contact means cooperating therewith; said movable contact means comprising a flat frame member composed of resilient material having laterally extending pivot means at the lower end; contact means at the upper end of said frame member; bias tab means extending acutely from the frame member at a point substantially along the pivot line connecting the pivot tabs; said pivot tabs pivotally attached to an opposing pair of housing walls so that the spring tab engages the wall between said opposing walls to bias the contact end of the frame member in a predetermined position with respect to the fixed contacts; a switch operating means within the housing including operating arm means rotatable about a fixed pivot with respect to the housing to effect operation of the contact means; said operating means comprising a twist lock mechanism fixed with respect to the housing and having a key end extending externally of the housing and a cam end extending within the housing; a cam end extending within the housing; an elongated actuator, fixedly mounted in the cam; said cam operable to rotate about a longitudinal axis through the lock when the key end is rotated; said actuator having ear means extending perpendicularly to said longitudinal axis and operable to engage the upper contact end of said frame member to change the condition of engagement between the fixed contacts and the movable contacts when the cam is rotated to a predetermined position with respect to the housing; and spring means for returning the actuator to the original condition when the key is released.

References Cited in the file of this patent

UNITED STATES PATENTS

| | | |
|---|---|---|
| 1,231,456 | Thomas | June 26, 1917 |
| 1,239,317 | Thomas | Sept. 4, 1917 |
| 1,482,603 | Faulhaber | Feb. 5, 1924 |
| 1,493,988 | Kerwin | May 13, 1924 |
| 2,269,171 | Benander | Jan. 6, 1942 |
| 2,572,335 | Hafke | Oct. 23, 1951 |
| 2,620,409 | Cobb et al. | Dec. 2, 1952 |
| 2,659,792 | Boardman | Nov. 17, 1953 |
| 2,681,966 | Christensen | June 22, 1954 |
| 2,748,214 | Immel | May 29, 1956 |
| 2,847,559 | Harrington et al. | Aug. 12, 1958 |
| 2,863,028 | Fraser et al. | Dec. 2, 1958 |